US006910258B2

United States Patent
Wang et al.

(10) Patent No.: US 6,910,258 B2
(45) Date of Patent: Jun. 28, 2005

(54) METHOD OF ASSEMBLING WINDINGS ON A ROTOR CORE

(75) Inventors: Yu Wang, Clifton Park, NY (US); Richard Nils Dawson, Vooheesville, NY (US); Christopher Anthony Kaminski, Niskayuna, NY (US); Robert John Nygard, Saratoga Springs, NY (US); James Pellegrino Alexander, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/677,340

(22) Filed: Oct. 3, 2003

(65) Prior Publication Data

US 2004/0070891 A1 Apr. 15, 2004

Related U.S. Application Data

(62) Division of application No. 10/005,093, filed on Dec. 7, 2001, now Pat. No. 6,629,356.

(51) Int. Cl.$^7$ .......................... H02K 15/02; H02K 15/10
(52) U.S. Cl. ............................ 29/598; 29/596; 29/605; 29/606; 310/156.27; 310/156.28; 310/203; 310/206; 310/208; 310/218; 361/23
(58) Field of Search ......................... 29/598, 596, 605, 29/606; 310/156.27, 156.28, 203, 206, 208, 218; 361/23

(56) References Cited

U.S. PATENT DOCUMENTS

| 4,855,630 | A | * | 8/1989 | Cole ...................... 310/156.28 |
| 5,801,470 | A | * | 9/1998 | Johnson et al. ........ 310/156.27 |
| 5,929,551 | A | * | 7/1999 | El-Antably et al. ......... 310/216 |
| 6,064,134 | A | * | 5/2000 | El-Antably et al. ......... 310/261 |

* cited by examiner

*Primary Examiner*—Carl J. Arbes
*Assistant Examiner*—Tim Phan
(74) *Attorney, Agent, or Firm*—Fletcher Yoder (57) ABSTRACT

A method is disclosed for fitting a rotor enclosure over at least one assembly of field windings mounted on a rotor core, said method comprising the steps: applying a force to elastically reduce a circumference of the at least one assembly of field windings mounted on the rotor core, where the reduction in circumference is greater than a circumference reduction due to just eliminating clearances between adjacent end-turns of windings; generating a clearance between the field windings and the rotor enclosure due to the application of the force; axially sliding the rotor enclosure over the at least one assembly of field windings while the circumference is reduced, and releasing the force to allow the circumference of the at least one assembly of field windings to expand and cause the enclosure to tightly fit on the at least one assembly of field windings.

8 Claims, 6 Drawing Sheets

METHOD OF ASSEMBLING WINDINGS ON A ROTOR CORE

This application is a divisional application of and claims priority to U.S. patent application Ser. No. 10/005,093, filed Dec. 7, 2001, (now U.S. Pat. No. 6,629,356).

BACKGROUND OF THE INVENTION

The present invention relates to rotors in synchronous machines. In particular, the invention relates to mounting rotor field winding and a field winding enclosure on a rotor.

Conventional generators have rotors with retaining rings to support field coil windings mounted on the rotor. Each rotor typically includes a cylindrical rotor core with axial slots to receive each coil turn of the field windings. During assembly, the winding is installed turn by turn into the slots of the rotor core. The field winding is typically assembled while it is being installed in the slots of the rotor core. The slots of the rotor receive the layers of the straight sections of the race-track shaped coil windings. The ends turns of the windings extend axially beyond both ends of the rotor core.

In conventional rotors, retaining rings are mounted over the end turns and on the rotor core. The retaining rings are short cylindrical structures that support the end turns with respect to the centrifugal forces that arise during rotor operation. The retaining rings are installed on the ends of the rotor core after the field windings are installed in the rotor slots. To reduce the circumference of the winding assemblies and rotor, a belt is wrapped around the winding assemblies to pull the winding coils together and eliminate clearances between the coil. During assembly, the metallic retaining rings are expanded by heat and then slid over the ends of the winding assemblies and rotor core. When the rings cool, they shrink to tightly fit on the rotor core. At normal operating temperatures, there is no clearance between the retaining rings and the end turns of the rotor windings.

BRIEF SUMMARY OF THE INVENTION

A need has arisen for new techniques and enclosures for field windings on rotor cores. A cylindrical rotor enclosure has been developed that fits over the rotor and end-turns of the field windings. The enclosure supports the entirety of the windings against centrifugal forces. The enclosure may be, for example, a single cylindrical sheath or a plurality of rings that cover the windings and rotor.

In a first embodiment, the invention is a method for fitting a rotor enclosure over at least one assembly of field windings mounted on a rotor core, said method comprising the steps: applying a force to elastically reduce a circumference of the at least one assembly of field windings mounted on the rotor core, where the reduction in circumference is greater than a circumference reduction due to just eliminating clearances between adjacent end-turns of windings; generating a clearance between the field windings and the rotor enclosure due to the application of the force; axially sliding the rotor enclosure over the at least one assembly of field windings while the circumference is reduced, and releasing the force to allow the circumference of the at least one assembly of field windings to expand and cause the enclosure to tightly fit on the at least one assembly of field windings.

In another embodiment, the invention is a method of assembling a plurality of field windings and securing the windings on a rotor core comprising the steps of arranging a plurality of field windings in a winding assembly; mounting the winding assembly on the rotor core; deforming a cross-sectional shape of a cylindrical rotor enclosure or the end-turn of the winding to created a clearance between the enclosure and end-turn; sliding the deformed rotor enclosure over the mounted winding assembly, and releasing the deformation of the rotor enclosure after the enclosure is positioned over the winding assembly.

DETAILED DESCRIPTION OF THE INVENTION

Figure 1:
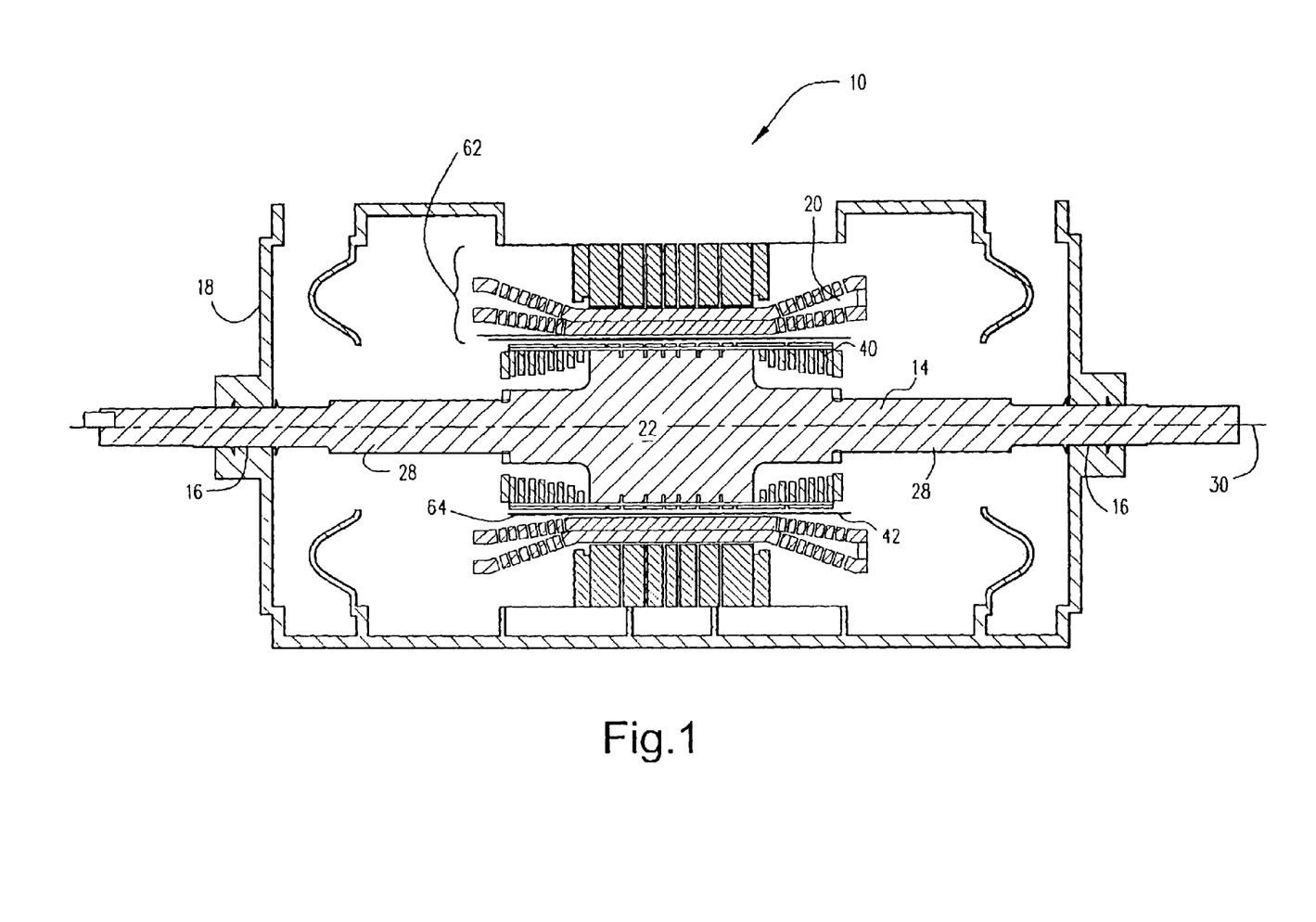
FIG. 1 is a cross-sectional diagram of a generator having a rotor and stator.

FIG. 1 is a cross-sectional diagram of an exemplary generator 10 having a stator 12 and a rotor 14. The rotor is supported on bearings 16 in a generator housing 18. The stator includes an annular array of armature windings (stator coils) 20 that form a cylindrical cavity around the rotor.

Figure 2:
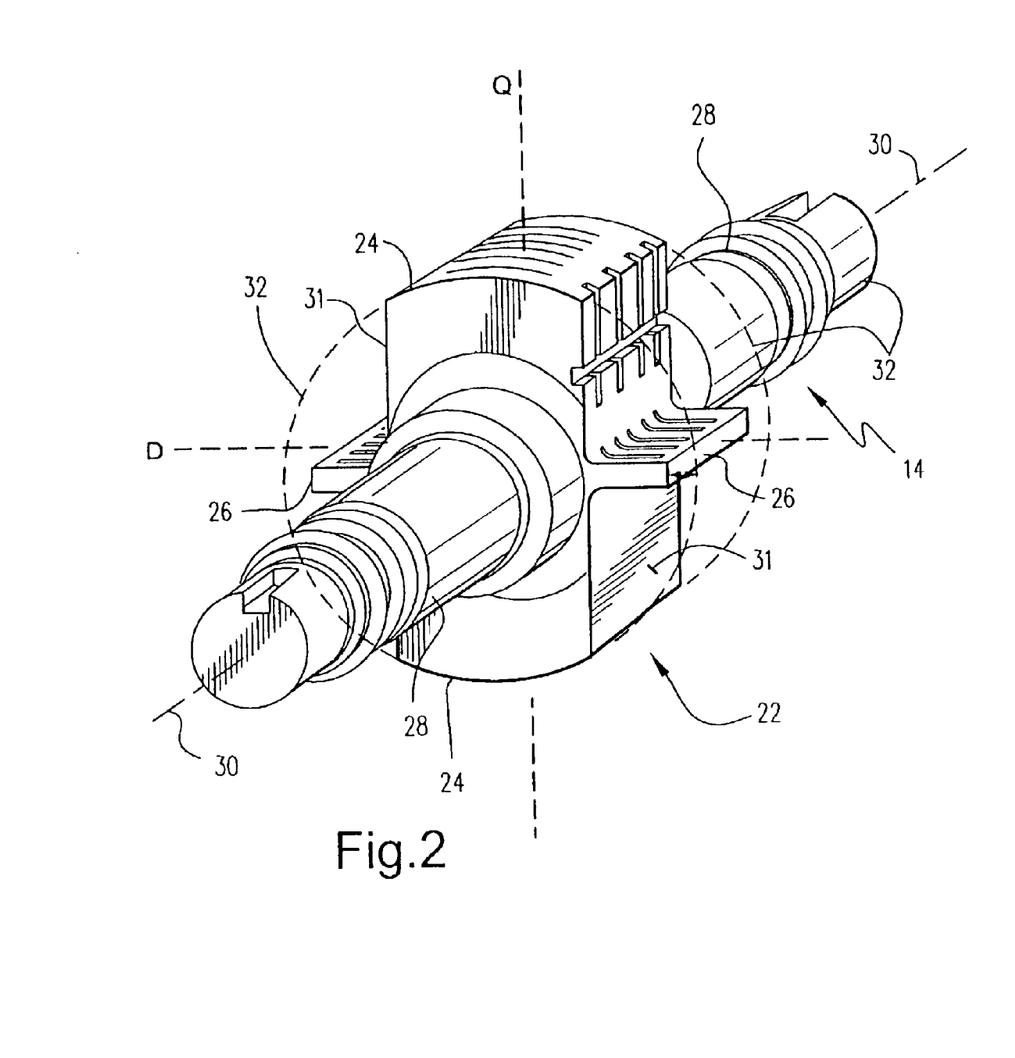
FIG. 2 is a perspective view of the rotor from the generator, wherein the rotor lacks field winding assemblies.

FIG. 2 is a diagram of a rotor 14 (without field winding assemblies and a rotor enclosure) having a generally rectangular rotor core 22 with opposite pole surfaces 24 arranged along a Q-axis. The rotor core includes fins 26 arranged along a D-axis of the core. The rotor core 14 is supported by rotor end shafts 28 that are axially (along the center-axis 30) aligned with the rotor core. The end shafts are supported by bearings 16. The end shafts may connect to a drive coupling to a power turbine and to an electrical collector.

The rotor core 22 may be formed of an iron forging. The fins 26 of the rotor core may be formed in any suitable manner, including being integral with the rotor core forging by being machined or forged from the rotor forging, cast with the rotor forging, or welded to the rotor forging. Alternatively, the fins 26 may be mechanically secured to the rotor core forging using dovetails or the like. The fins may extend radially a shorter distance than do the pole surfaces 24.

The rotor core 22 is generally semi-rectangular in cross section and has a pair of opposite flat surfaces 21 and a pair of opposite arc-shaped surfaces 24. The fins 26 extend upright from the longitudinal center of the flat surfaces of the rotor core. The arced surfaces 24 of the rotor poles extend to a cylindrical rotational envelope 32 define by the rotation of the rotor core. The diameter of the envelope is slightly smaller than the diameter of the rotor cavity formed in the stator 12. The fins may not extend to the envelope 32. There may be a clearance 68 between the fins and the envelope. This clearance assists in mounting a rotor enclosure 42 on the rotor core.

Figure 3:
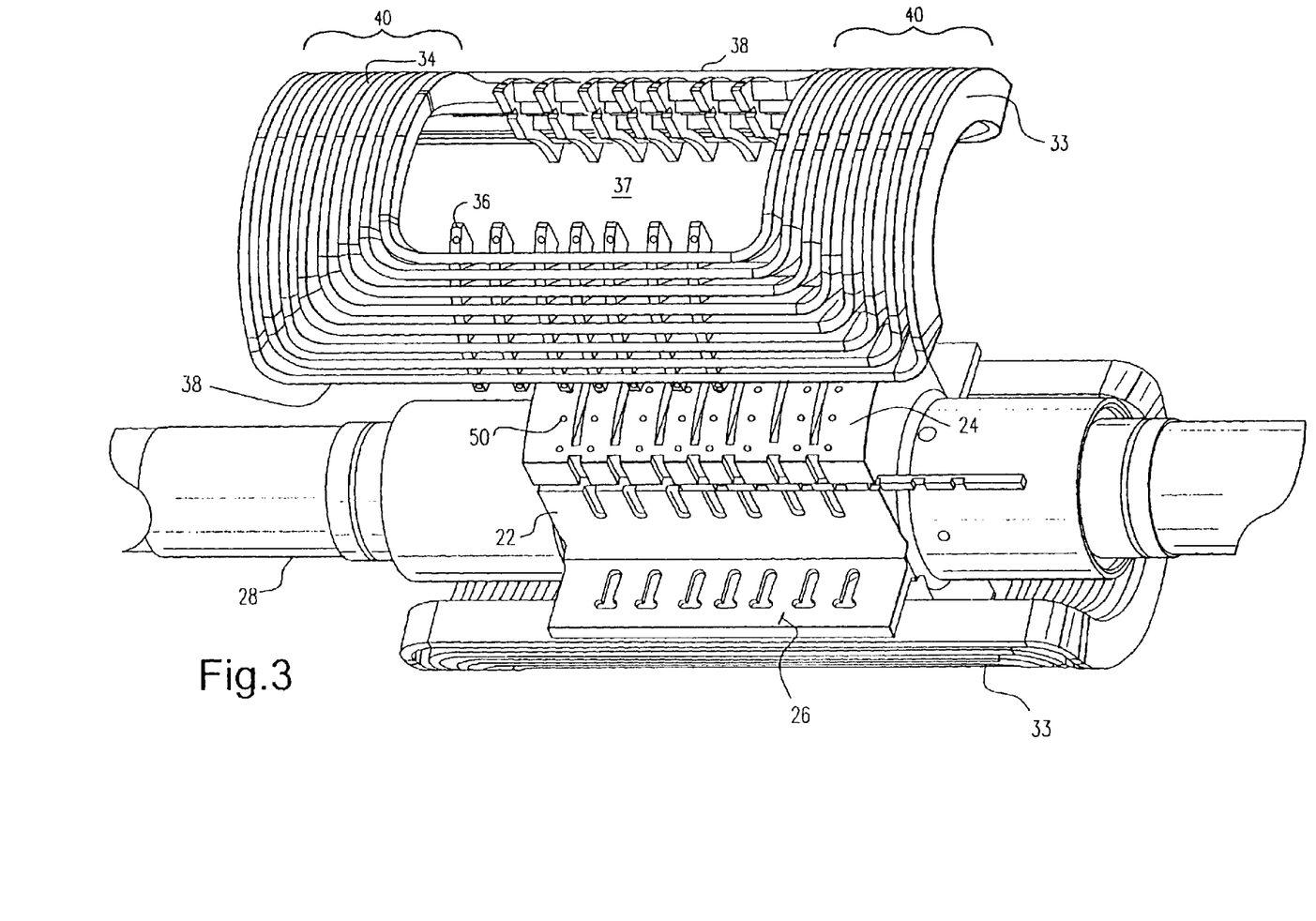
FIG. 3 is an assembly drawing showing a rotor assembly incorporating the field winding assembly.

FIG. 3 is a perspective view of a field winding assembly 33 being mounted on the rotor core 22. The winding assembly is prefabricated with windings 34 and spacers 36 before being mounted on the rotor core. The winding assembly 33 is aligned with the rotor core such that a center open aperture 37 of the coil windings is above the semi-rectangular rotor core (see pole surface 24) and coaxial with the Q-axis of the core. A hoist or other mechanical lifting device may be used to move the winding assembly over the rotor core. While a two-winding assembly arrangement is shown here, other embodiments of the winding/rotor assembly may have one, or three or more winding assemblies mounted on the rotor.

The field windings 33 may be formed of copper or other highly-conductive material. Each winding 34 may have a racetrack shape, but other winding shapes may be employed such as a saddle shape. The racetrack windings each have a pair of straight long sides 38, and a semi-circular end-turn sections 40. The long sides 38 of the windings are supported by the spacers 36 that engage the rotor core. The spacers are distributed along the length of each side 38 of the winding array 33.

The end-turns 40 of the windings extend laterally beyond the rotor core 22 and over a portion of the end shaft sections 28. The end-turns 40 are contained by a cylindrical composite enclosure 42 (FIG. 4) that fits over the outer surfaces of the winding assemblies and rotor core.

The cylindrical rotor enclosure 42 assists in supporting the winding assemblies 33 on the rotor core 22, especially with respect to centrifugal forces. The enclosure 42 may be a non-metallic composite material or may be metallic. The enclosure provides an outer circumferential housing for the field windings 34 and supports the windings with respect to centrifugal forces that arise during rotation of the rotor. The enclosure extends axially beyond the ends of the rotor core so as to cover the end-turns 40 of the field windings. The arc-shaped pole surfaces 24 of the rotor core have apertures 50 to receive connections, e.g., threaded bolts that extend through the enclosure 42 and into the rotor, to secure the enclosure to the surface of the rotor core.

The rotor enclosure fits over non-cylindrical rotor cores and modular rotor windings that have recently been developed. Fitting a cylindrical enclosure over a non-cylindrical rotor cores is problematic due to the incompatibility of the shapes of the enclosure and rotor core, and the need for a tight fit between the enclosure and rotor core. In addition, modular winding assemblies may require centrifugal support from the enclosure. Accordingly, there is a need for a new technique to mount rotor enclosures on rotor cores and over field windings.

A technique has been developed to mount a cylindrical rotor enclosure over a non-cylindrical rotor core and winding assembly. The rotor enclosure may be formed of composite materials that do not substantially deform when heated, as do traditional metal retaining rings. Accordingly, a technique is needed to deform a non-metallic cylindrical enclosure and/or the winding assemblies so that the rotor enclosure will fit over the rotor core and winding assemblies.

Before the enclosure is slid over the rotor core, the enclosure or the end turns of the winding assemblies (or both) are deformed to facilitate sliding the enclosure on the rotor core. The end turns may be elastically deformed radially inward by wrapping a belt 70 around the circumference of the assemblies of windings. As the belt tightens, the circumference around the assemblies of windings is reduced because (i) the clearances between the coil windings are reduced until the windings are in contact with each other, (ii) the spacers deform under the force of the belt, and (iii) the shape of the rotor core allows the winding assemblies to be deformed more than do conventional cylindrical rotor cores with slots for the windings. The reduction in the circumference of the coil winding assemblies mounted on the rotor is substantially greater that the reduction in circumference achieved by belt tightening of conventionally mounted windings on conventional rotors.

When reduced by a belt 70 (or other force), the circumference of the winding assemblies may be out of round and, thus, non-circular. For example, the belt tightening may cause the end-turns of the winding assemblies to form an overall oval cross-sectional shape. This non-circular cross-sectional shape should not be permanent as the winding assemblies (including their spacers) should return to their usual shape after the rotor enclosure has been installed and the belt removed.

A wrapping force 44 is applied by the belt to the rotor winding reduce the cross sectional circumference of the winding assemblies. The reduction in the cross-sectional area of the winding assemblies exceeds the reduction that could have been achieved by just eliminating the gaps between the end-turns of the field winding coils. The reduced circumference of the winding assemblies is needed to provide sufficient clearance between the winding assemblies and the rotor enclosure.

The shape of the reduced circumference of the winding assemblies and rotor may be somewhat unpredictable. The circumferential shape may vary due to the manner in which the spacers deform, how the windings are pushed together, and the shape of the rotor core. The circumferential shape may be oval or some other out-of-round shape. The rotor enclosure must accommodate the out-of-round shape of the winding assemblies because the enclosure slides over the reduced circumference rotor with winding assemblies.

The rotor enclosure is generally circular in cross-section. If the rotor and winding assemblies have an out-of-round cross sectional shape when deformed, then sliding the circular cross-sectioned rotor enclosure over the rotor will be problematic. If the cross-section of the rotor enclosure is deformed to match a deformed cross section of the deformed winding assemblies and rotor, enclosures should more easily slide over the winding assemblies and rotor.

Accordingly, a technique has been developed to deform the rotor enclosure to match the deformation of the cross-section of the winding assemblies and rotor. A deformation tool 56 may be used to deform the enclosure into a cross-sectional shape to match the circumferential shape of the winding assemblies. The deformation tool is applied to the enclosure, as the enclosure slides over the rotor core. The deformation tool may be used by a technician installing the rotor enclosure. As the enclosure slides over the rotor core, the enclosure deformation may be adjusted to adapt to the cross-sectional shape of the rotor core.

Once the enclosure is properly positioned over the rotor core and field winding assembly, the belt 56 is removed from the end turns. Similarly, the deformation tool is removed from the enclosure and the enclosure returns to its normal cylindrical shape, with circular cross-section. In its normal shape, the enclosure tightly fits around the rotor core and supports the rotor field windings against centrifugal forces that occur during normal rotor operation.

Figure 4:
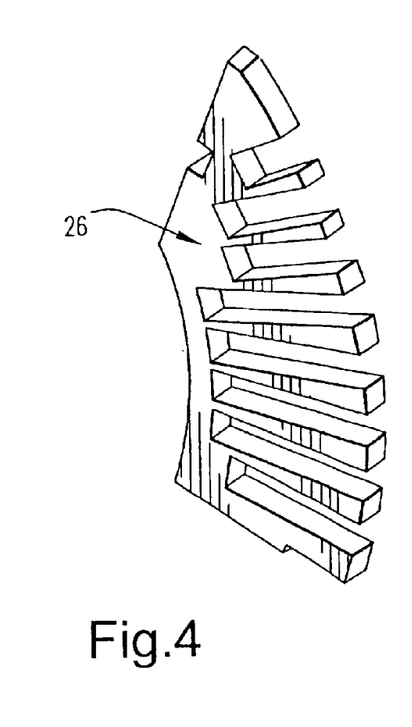
FIG. 4 is a perspective view of a field winding and spacer assembly.

FIG. 4 is a perspective view of a spacer 36 that has a quarter-disk shape with teeth and slots between the teeth. The spacers are distributed along the long sides 38 of the windings 34. The slots formed between the teeth of the spacers each receive a winding.

The spacers may be formed of a metallic material or a non-metallic material, such as a composite material. The spacers may be ductile so as to flex when subjected to a force and then return to its original shape when the force is released. This elastic deformation of the spacer can be used to cause the entire winding assembly to deform radially inward as the rotor enclosure slides over the rotor and winding assemblies. The winding assemblies return to their original shape when the force deforming the assemblies is released. Plastic deformation of the spacers and hence the entire winding assembly is avoided as the rotor enclosure is mounted on the rotor and winding assemblies.

Figure 5:
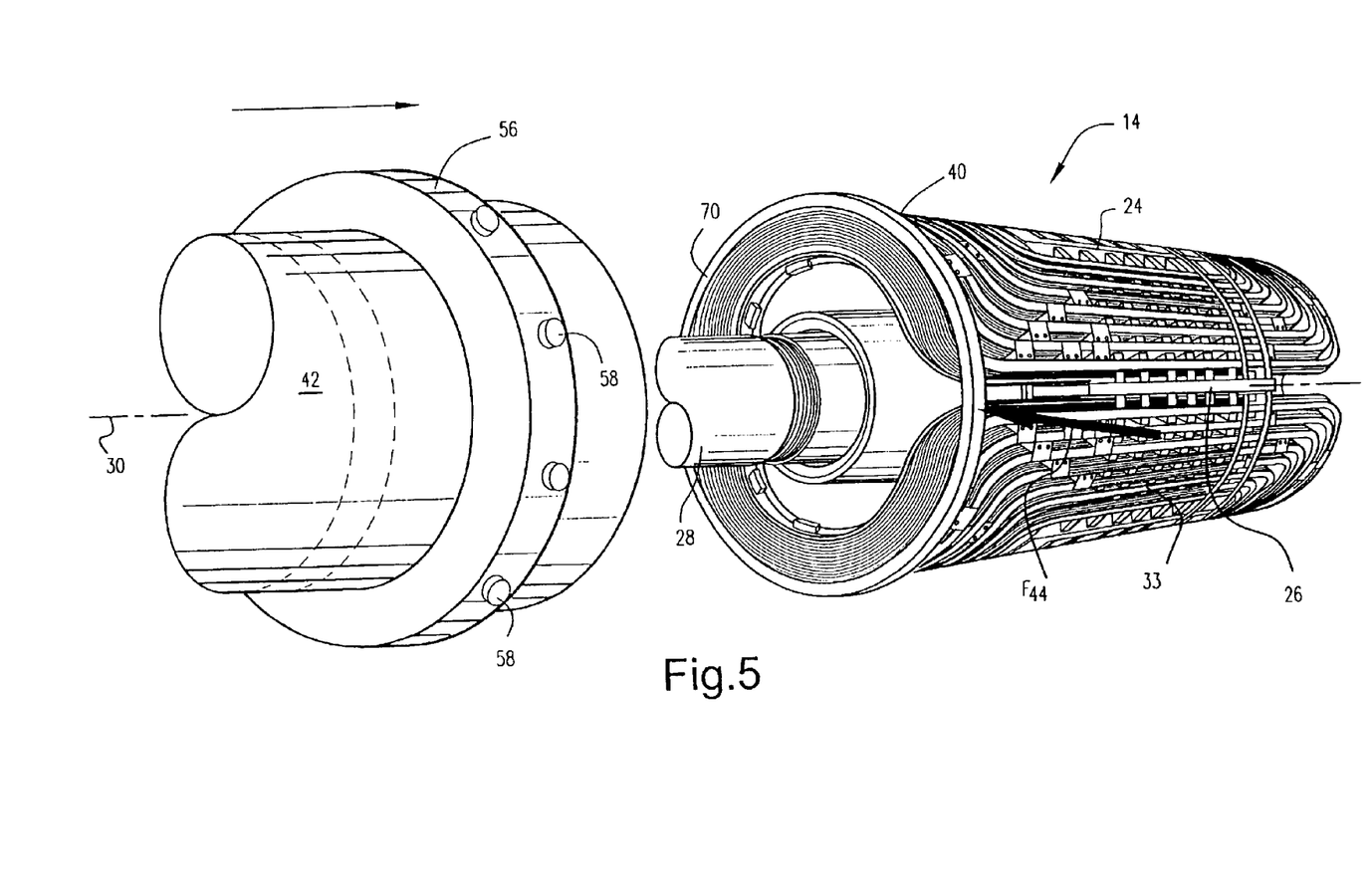
FIG. 5 shows a rotor enclosure being mounted onto a rotor core and winding assembly.

FIG. 5 shows a rotor enclosure 42 being mounted on a rotor 14 with winding assemblies 33. Initially, the cylindrical enclosure 42 is axially offset from the rotor core and aligned with the centerline of the 30 of the rotor. The enclosure may or may not be fitted to the rotor core before the end shafts 28 are attached to the rotor core. The enclosure is moved axially along the center line of the rotor by a hoist or other mechanism to slide the enclosure over the rotor core. A deformation collar 56 fits over the enclosure and deforms the cross-sectional shape of the enclosure to better fit over the rotor and winding assemblies. In addition, a force 44 may be applied radially to the end-turns 40 to deflect the end-turn inwards while the enclosure slides over the winding assemblies.

The rotor enclosure 42 may be a single cylinder that covers the windings 34. Alternatively, the enclosure 48 may be a series of composite rings (see dotted lines that illustrate a series of rings on a figure of a single piece rotor enclosure) around the windings, and are in a series along the length of the windings. The enclosure rings may be a series of narrow rings that fit around the rotor core and long sides 38 of the winding. Wider rings may fit over the end turns 40 of the windings. The rings may be formed of a composite material that may or may not include metallic materials. A cylindrical metallic shield 64 may be wrapped around the enclosure, winding assemblies and rotor core.

Figure 6:
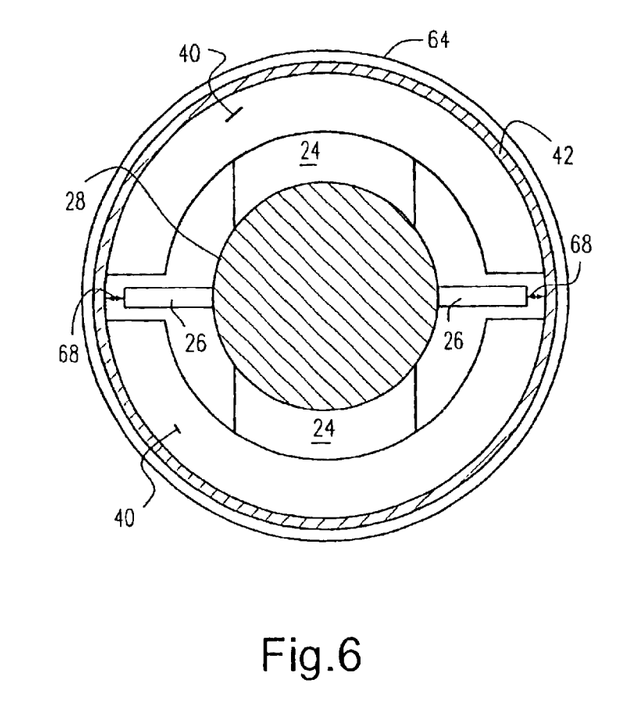
FIG. 6 is a cross-sectional diagram showing an enclosure with a circular cross-sectional shape and fitted over a rotor core-winding assembly.

FIG. 6 is a cross-sectional diagram showing an enclosure 42 with a circular cross-sectional shape and fitted over a pair of rotor core-winding assemblies 33. The rotor enclosure 42 fits tightly around the winding assemblies and, thus, provides support to the windings with respect to centrifugal forces. Due to the tight fit, the enclosure does not easily slide over the windings when the enclosure is being fitted over the winding assemblies and rotor core.

Figure 7:
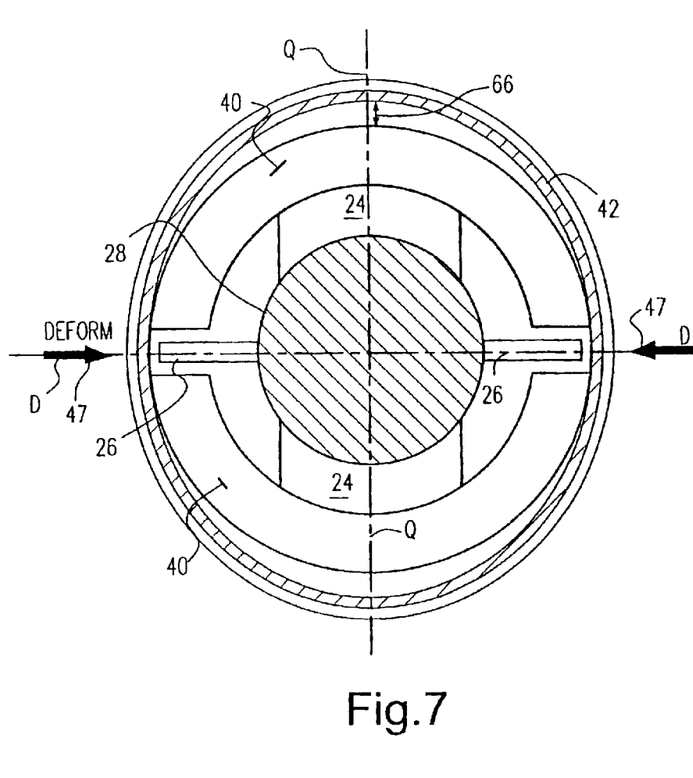
FIG. 7 is a cross-sectional diagram showing an enclosure with an out-of-round cross-sectional shape and fitted over a rotor core-winding assembly.

FIG. 7 is a cross-sectional diagram showing the enclosure 42 with an out-of-round cross-sectional shape and fitted over a rotor core-winding assembly. The deformation 47 to the enclosure may be applied by a deformation tool. The rotor enclosure 42 has been deformed so as to have an oval cross-sectional shape. The oval shape fits over the end-turn sections 40 of the opposite winding assemblies 33. Thus, the deformation of the rotor enclosure facilitates the sliding of the enclosure over the end turns of the winding assemblies and over the rotor core.

There is a clearance 68 between the rotor enclosure 42 (before it is mounted on the rotor) and the fins 26 of the rotor. This clearance 68 in the D-axis (see FIG. 2) facilitates sliding the enclosure over the rotor. In particular, the enclosure 42 and/or the end-windings 40 are deformed so that the enclosure slides over the rotor. The clearance 68 between the rotor and enclosure along the D-axis allows the enclosure to be deformed along the D-axis. The deformation bows out the enclosure along the Q-axis to form a clearance 66 that allows the enclosure to slide over the rotor poles 24.

In addition to (or alternatively) the end-windings 40 may be deflected radially inward to reduce the cross-sectional width of the windings along the Q-axis. The deformation of the enclosure and/or the deflection of the windings, should provide sufficient clearance to allow the enclosure to slid over the rotor. Once the enclosure is in place, the force deforming the enclosure and/or the force deflecting the end-turn are released so that the windings and rotor core fit tightly in the Q-direction with the enclosure.

The modular windings 34 are mounted to the rotor to allow radial deformation of the windings, at least at the end-turns 40 of the windings. The elasticity of the windings and the overhang of the end-turns allows for deformation of the winding end-turns while the rotor enclosure slides onto the rotor. The radially inward elastic deformation of the end-turns can be produced through a radially inward force (F) 44 applied to one or more locations of the winding end-turns. The force 44 may be applied as opposing forces on opposite sides of the windings. Similarly, the winding deformation can be achieved by wrapping the windings with a belt 70 to apply a circumferential force that deflects the end turns radially inward.

The deformation of the windings assists in providing a clearance 66 to reduce the circumference shape of the windings while the rotor enclosure slides over the rotor. This radial clearance 66 between the windings and rotor enclosure is formed by the application of a mechanical force to the windings and/or the rotor enclosure. The clearance 66 is achieved without thermal expansion of the enclosure.

Figure 8:
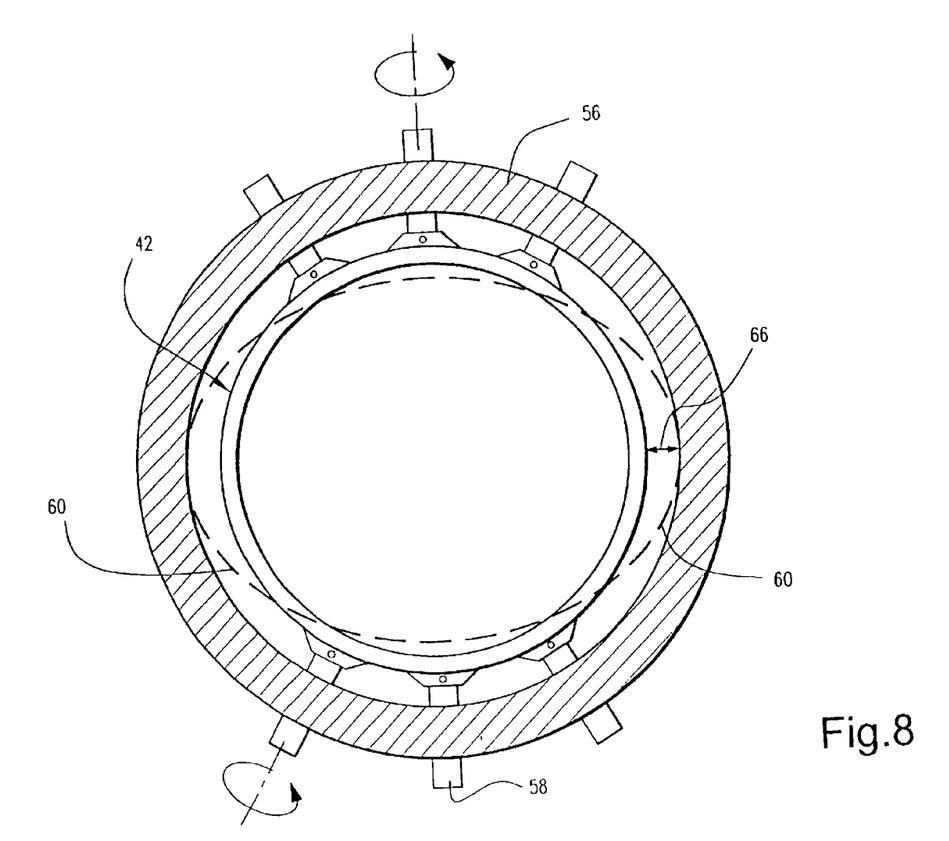
FIG. 8 is a cross-sectional diagram of a deformation tool to deform the cross-sectional shape of the rotor enclosure as it is slid over the rotor core.

FIG. 8 is a cross-sectional diagram of a deformation collar tool 56 to deform the cross-sectional shape of the rotor enclosure 42 as it is slid over the rotor core. The deformation collar has posts 58 arranged around its periphery. These posts may be screwed inward against the cylindrical enclosure and deform the enclosure to an out-of-round shape. A technician may manually screw the posts against the enclosure or the movement of the posts may be automated. Each screw post 58 applies a force to a point on the circumference of the rotor enclosure. This force deforms the cross-sectional shape of the enclosure.

By selective adjustment of the posts 58 around the circumference of the deformation tool 56, the forces applied by all of the posts can deform 60 the cross-sectional shape of the enclosure to fit over the end windings and rotor core. The technician may determine the optimal out-of-round shape for the enclosure or a manual for the generator may show the best out-of-round shape for the enclosure. The out-of-round shape is selected so that the enclosure may more easily slide over the end-turns of the winding assembly.

The deformed rotor enclosure 42 with the deformation tool 56 mounted thereon are axially aligned with an end of the rotor. A hoist may support the enclosure and deformation tool as both are slid axially over the end turns of the windings mounted on the rotor core. If necessary, the deformation tool may be adjusted to vary the deformation of the enclosure as it slides over the end turns and thereafter the end of the rotor core. The deformation tool is removed from the rotor enclosure by loosening the screw posts 58 after the enclosure has been properly positioned on the winding assemblies and rotor core. If the rotor enclosure is a series of rings, then the deformation tool is applied to each ring in sequence as the ring is to be slid onto the winding assemblies and rotor core.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method assembling a plurality of field windings and securing the windings on a rotor core comprising the steps of:
   (a) arranging a plurality of field windings in a winding assembly;
   (b) mounting the winding assembly on the rotor core;
   (c) deforming the mounted winding assembly on the rotor core to reduce a circumference of the assembly on the rotor core;
   (d) deforming a cross-sectional shape of a cylindrical rotor enclosure to match a circumferential shape of the winding assembly as mounted on the rotor core and thereby create a clearance between the enclosure and mounted winding assembly;
   (e) sliding the formed rotor enclosure over the mounted winding assembly; and
   (f) releasing the deformation of the rotor enclosure after the enclosure is positioned over the winding assembly.

2. A method as in claim 1 wherein the rotor enclosure is a single cylinder.

3. A method as in claim 1 wherein the rotor enclosure is a series of rings, and steps (a) to (e) are repeated as each ring is fitted over the at least oen assembly of field windings.

4. A method as in claim 3 wherein said at least one assembly of field windings is a pair of field windings assemblies mounted opposite to each other on said rotor core.

5. A method as in claim 1 wherein the rotor enclosure is a non-metallic composite material.

6. A method as in claim 1 wherein a deformation collar around the enclosure applies the force to deform the enclosure.

7. A method as in claim 1 further comprising the step of applying a metallic shield over the rotor enclosure.

8. A method as in claim 1 wherein where the deformation of the winding assembly includes deforming spacers between the windings.

* * * * *